(12) United States Patent
Arthur

(10) Patent No.: US 8,062,803 B2
(45) Date of Patent: Nov. 22, 2011

(54) FUEL CELL SYSTEM AND A METHOD OF GENERATING ELECTRICITY

(75) Inventor: Alan R. Arthur, Salem, OR (US)

(73) Assignee: Eveready Battery Company, Inc., St. Louis, MO (US)

( * ) Notice: Subject to any disclaimer, the term of this patent is extended or adjusted under 35 U.S.C. 154(b) by 1074 days.

(21) Appl. No.: 11/906,818

(22) Filed: Oct. 3, 2007

(65) Prior Publication Data
US 2008/0085434 A1 Apr. 10, 2008

Related U.S. Application Data

(62) Division of application No. 10/679,605, filed on Oct. 1, 2003, now Pat. No. 7,306,868.

(51) Int. Cl.
*H01M 8/04* (2006.01)

(52) U.S. Cl. ......... 429/440; 429/441; 429/442; 429/471

(58) Field of Classification Search ............... 429/13, 429/17, 26, 22, 24, 34, 32; 422/187, 188
See application file for complete search history.

(56) References Cited

U.S. PATENT DOCUMENTS

| | | | |
|---|---|---|---|
| 3,044,284 A | 7/1962 | Kratzenberger | |
| 4,473,622 A | 9/1984 | Chluzinski et al. | |
| 4,640,876 A | 2/1987 | Warzawski et al. | |
| 5,413,879 A | 5/1995 | Domeracki et al. | |
| 5,480,738 A | 1/1996 | Elangovan et al. | |
| 5,525,311 A | 6/1996 | Girod et al. | |
| 6,124,053 A | 9/2000 | Bernard et al. | |
| 6,322,919 B1 | 11/2001 | Yang et al. | |
| 6,602,626 B1 | 8/2003 | Allen | |
| 2001/0049039 A1* | 12/2001 | Haltiner, Jr. | 429/24 |
| 2002/0102445 A1 | 8/2002 | Senner | |
| 2003/0157002 A1 | 8/2003 | Andel et al. | |
| 2004/0081871 A1 | 4/2004 | Kearl et al. | |
| 2004/0157096 A1 | 8/2004 | Peterson | |
| 2005/0048333 A1* | 3/2005 | Pettit | 429/20 |
| 2006/0257302 A1 | 11/2006 | Deshpande et al. | |

FOREIGN PATENT DOCUMENTS

| | | |
|---|---|---|
| JP | 59-225211 | * 12/1984 |
| WO | 0233770 | 4/2002 |
| WO | 03063276 | 7/2003 |

* cited by examiner

*Primary Examiner* — Raymond Alejandro
(74) *Attorney, Agent, or Firm* — Russell H. Toye, Jr.

(57) ABSTRACT

An integrated fuel cell stack and catalytic combustor apparatus includes a fuel cell stack assembly having multiple fuel cell stacks between which is defined a cavity, each of said fuel cell stacks including a plurality of individual fuel cells; and a catalytic combustor disposed at least partially within the cavity, the catalytic combustor having a catalytic bed and a catalytic igniter. Also disclosed are a method of producing electricity including catalytically combusting surplus reactants of the reaction of an oxidant and a fuel across fuel cell stacks within a catalytic combustor disposed between the stacks to normalize the temperature profile along the fuel cell stacks, and a fuel cell system including means for normalizing a temperature profile along a length of a means for conducting an electrochemical reaction using an opposite heat generation temperature profile.

10 Claims, 10 Drawing Sheets

FUEL CELL SYSTEM AND A METHOD OF GENERATING ELECTRICITY

This application is a divisional of prior application Ser. No. 10/679,605, filed on Oct. 1, 2003, now U.S. Pat. No. 7,306,868.

BACKGROUND

During the past several years, the popularity and viability of fuel cells for producing both large and small amounts of electricity has increased significantly. Fuel cells conduct an electrochemical reaction with reactants such as hydrogen and oxygen to produce electricity and heat. Fuel cells are similar to batteries except fuel cells can be "recharged" while providing power. In addition, fuel cells are cleaner than other sources of power, such as devices that combust hydrocarbons.

Fuel cells provide a DC (direct current) voltage that may be used to power motors, lights, computers, or any number of electrical appliances. A typical fuel cell includes an electrolyte disposed between an anode and a cathode. An electrochemical reaction is conducted in the fuel cell in which an oxidant, such as air, is fed to the cathode. From the incoming air, the cathode supplies oxygen ions to the electrolyte. A fuel such as hydrogen or methane is fed to the anode where it is transported to the electrolyte to react with the oxygen ions. This reaction produces electrons, which are then introduced into an external circuit as useful power.

Not all fuel introduced into a fuel cell system will be utilized. This incomplete utilization is due, at least in part, to depletion effects. Depletion effects are the decreasing concentration of fuel in a fuel stream as it passes over a fuel cell stack in the flow direction. Depletion effects result in a higher amount of heat at the fuel entrance that decreases as the fuel passes over the fuel cell stack in the flow direction. This heat generation profile causes a corresponding temperature gradient in the fuel cell stack. This temperature gradient may contribute to a decreasing power production profile of the individual fuel cells corresponding to the temperature gradient due to the correlation between operating temperature and power production.

In addition, typical systems currently do little to manage cathode airflow over the fuel cell stack. Typically the airflow is approximated by a plug flow. Plug flow is a substantially uniform amount of airflow entering one end of flow duct having a uniform cross section and exiting at the other end with no augmentation along the flow path. Plug flow results in constant velocity over each cross section of flow in the duct. As a result, the convective heat transfer from the fuel cell stack to the cathode air is hindered by the rising free stream temperature as the air flows along the length of the fuel cell stack. This phenomenon adds to thermal gradients occurring across the cell. In order to minimize this effect and to provide the required cooling for the cell, current systems use up to 700 to 800% of the air that is actually required stoichiometrically for the reaction. Moving this volume of air requires larger pumps, more power to run those pumps, and larger valves. This, in turn, leads to higher operating costs.

SUMMARY

An integrated fuel cell stack and catalytic combustor apparatus includes a fuel cell stack assembly having multiple fuel cell stacks between which is defined a cavity, each of said fuel cell stacks including a plurality of individual fuel cells; and a catalytic combustor disposed at least partially within the cavity, the catalytic combustor having a catalytic bed and a catalytic igniter.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

Throughout the drawings, identical reference numbers designate similar, but not necessarily identical, elements.

DETAILED DESCRIPTION

An integrated fuel cell stack and catalytic combustor includes a fuel cell stack assembly having opposing fuel cell stacks between which is defined a cavity. Each of the fuel cell stacks includes a plurality of individual fuel cells each having an anode, a cathode, and an electrolyte. A catalytic combustor is disposed at least partially within the cavity. The catalytic combustor includes a catalytic bed and a catalytic igniter.

In the following description, for purposes of explanation, numerous specific details are set forth in order to provide a thorough understanding of the present method and apparatus. It will be apparent, however, to one skilled in the art that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

An integrated fuel cell stack and catalytic combustor generally includes a catalytic combustor disposed within a tubular fuel cell assembly that is, in turn, surrounded by a cathode air profiling shell that creates a cathode air plenum over the tubular fuel cell. An external view of the integrated fuel cell stack and catalytic combustor is discussed with reference to FIG. 1, the fuel cell stack assembly with reference to FIG. 2, and the catalytic combustor with reference to FIG. 3A.

Figure 1:
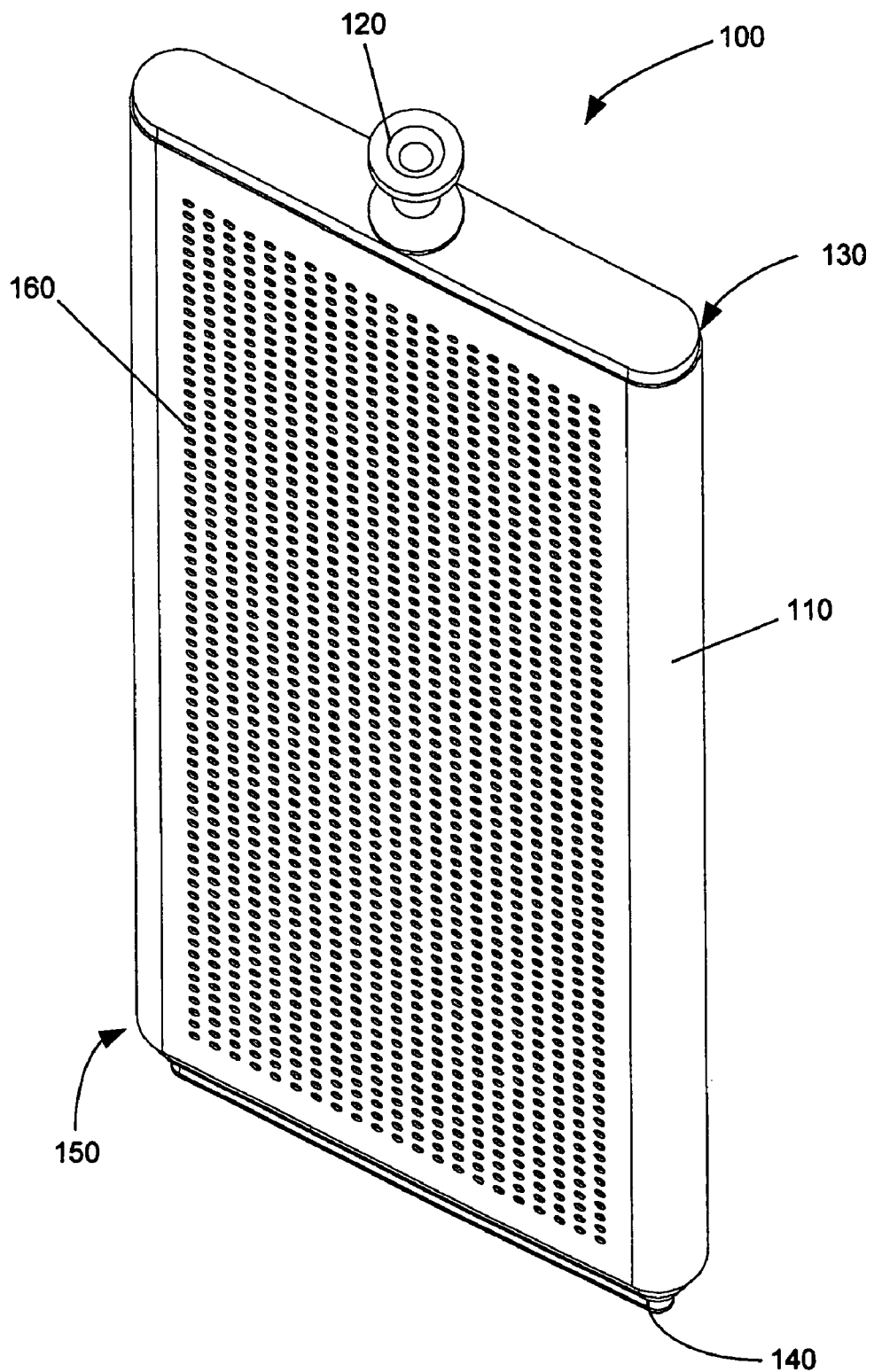
FIG. 1 illustrates a perspective view of an integrated fuel cell stack and catalytic combustor according to one exemplary embodiment.
Figure 2:
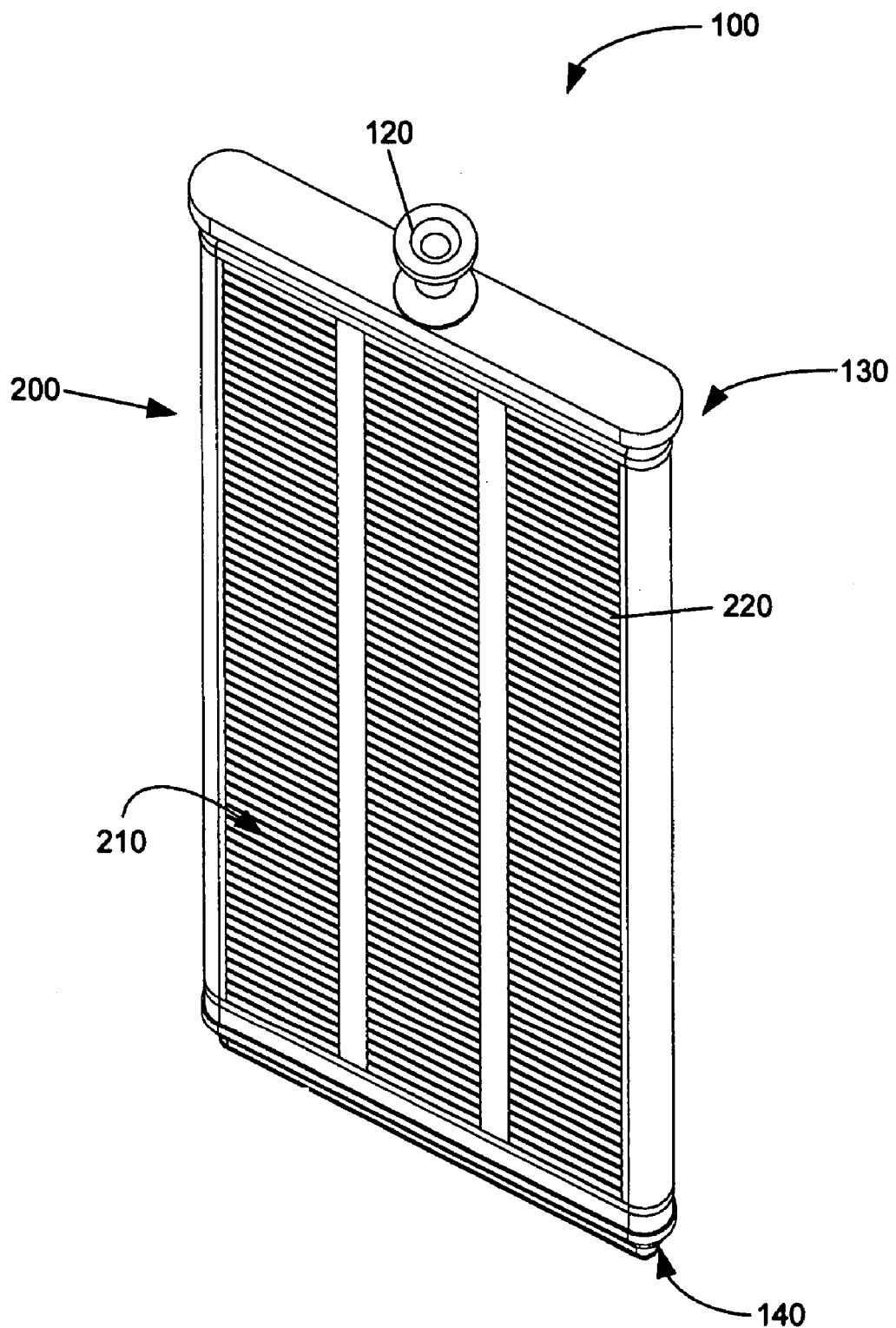
FIG. 2 illustrates a perspective view of a fuel cell stack assembly implemented in one exemplary embodiment.

FIG. 1 illustrates an integrated fuel cell stack and catalytic combustor (100) that generally includes a cathode air profiling skin (110), which surrounds a tubular fuel cell stack assembly (200, FIG. 2). An excess cathode air router (120) is disposed on a distal end (130) of the integrated fuel cell stack and catalytic combustor (100) and a seal assembly (140) is disposed on the proximal end (150).

The cathode air profiling skin (110) has performance optimized air inlet holes (160) to control how much and where cathode air is introduced to the surface of the fuel cell stacks (210, FIG. 2). Additionally, the cathode air profiling skin (110) is coupled to the positive buss strip (not shown) near the proximal end (150) of the integrated fuel cell stack and catalytic combustor (100). As discussed below, this coupling provides electrical routing and connects multiple power producing fuel cell stacks of the fuel cell stack assembly in parallel.

FIG. 2 illustrates an integrated fuel cell stack and catalytic combustor apparatus (100) with the cathode air profiling skin (110, FIG. 1) removed to show the fuel cell stack assembly (200). The fuel cell stack assembly (200) includes flat fuel cell stacks (210). Each of the fuel cell stacks (210) includes a plurality of individual fuel cells (220) formed on a substrate as shown in FIG. 2. In some embodiments, the substrate is formed of a porous material, such as a ceramic.

Figures 3A, 3B:
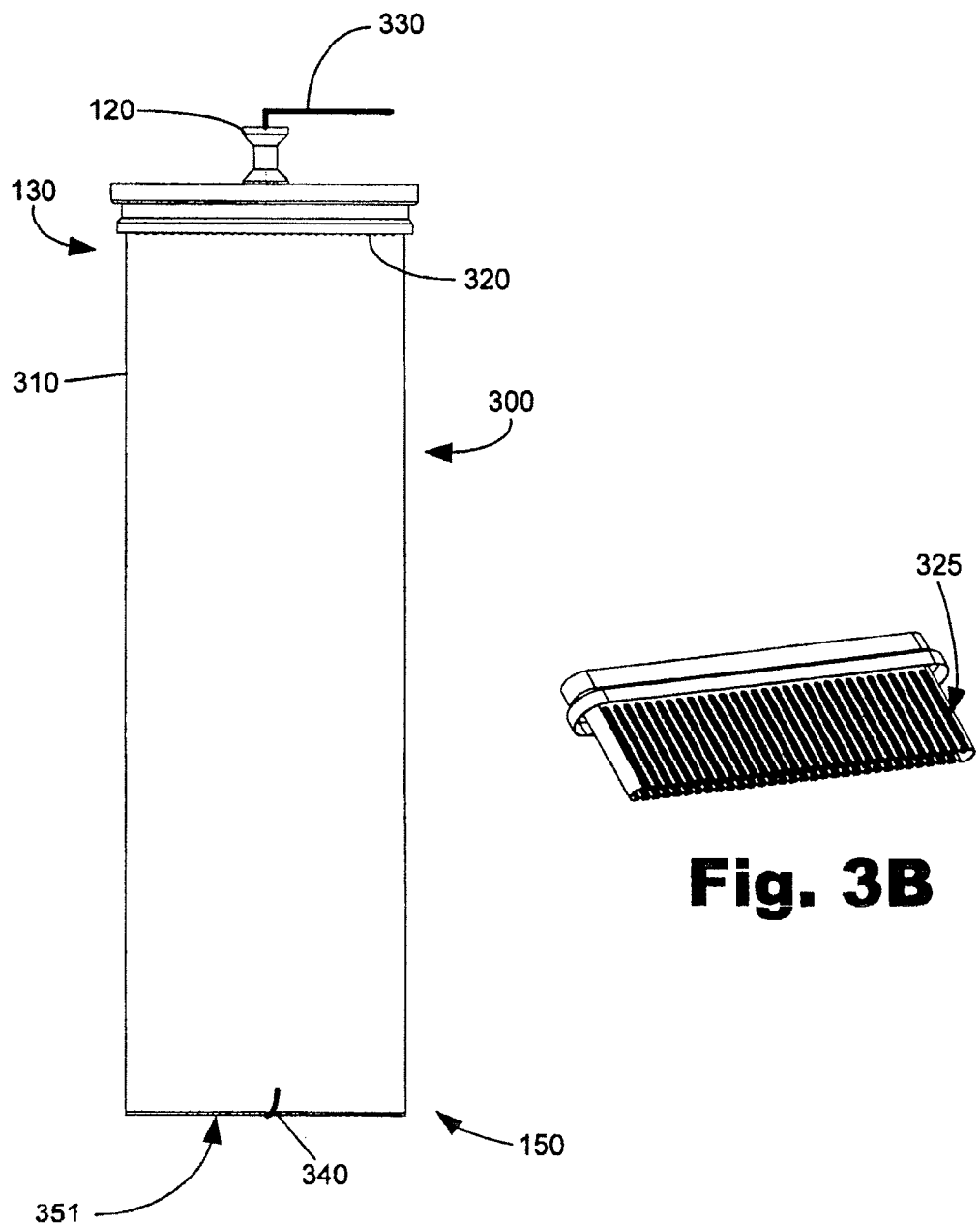
FIG. 3A illustrates a catalytic combustor implemented in one exemplary embodiment.
FIG. 3B illustrates a perspective view of a flame arrestor according to one exemplary embodiment.

FIG. 3A illustrates a catalytic combustor (300) disposed on the interior of the fuel cell stack assembly (200, FIG. 2). The catalytic combustor (300) is surrounded by a shell (310). Fluid flow through conduits or pass-throughs (320) defined in the shell (310) in combination with a flame arrestor (325, FIG. 3B) in the distal end (130) convey unutilized fuel exiting the fuel cell stacks (210, FIG. 2) to the tubular interior of the catalytic combustor (300). The purpose of the flame arrestor (325) is to prevent any flame from the catalytic interior reaching the fuel side of the tubular fuel cell stack (200, FIG. 2). Catalytic flow channels (not shown) route the remaining cathode air, surplus fuel, and reaction byproducts to the catalytic combustor (300). An igniter wire (330), which facilitates catalytic combustion, extends through the catalytic combustor (300) and terminates in a ground end (340). In addition to including ground end (340), the proximal end (150) of the catalytic combustor (300) includes a catalytic exhaust (350) defined therein.

Exemplary Implementation and Operation

Figure 4:
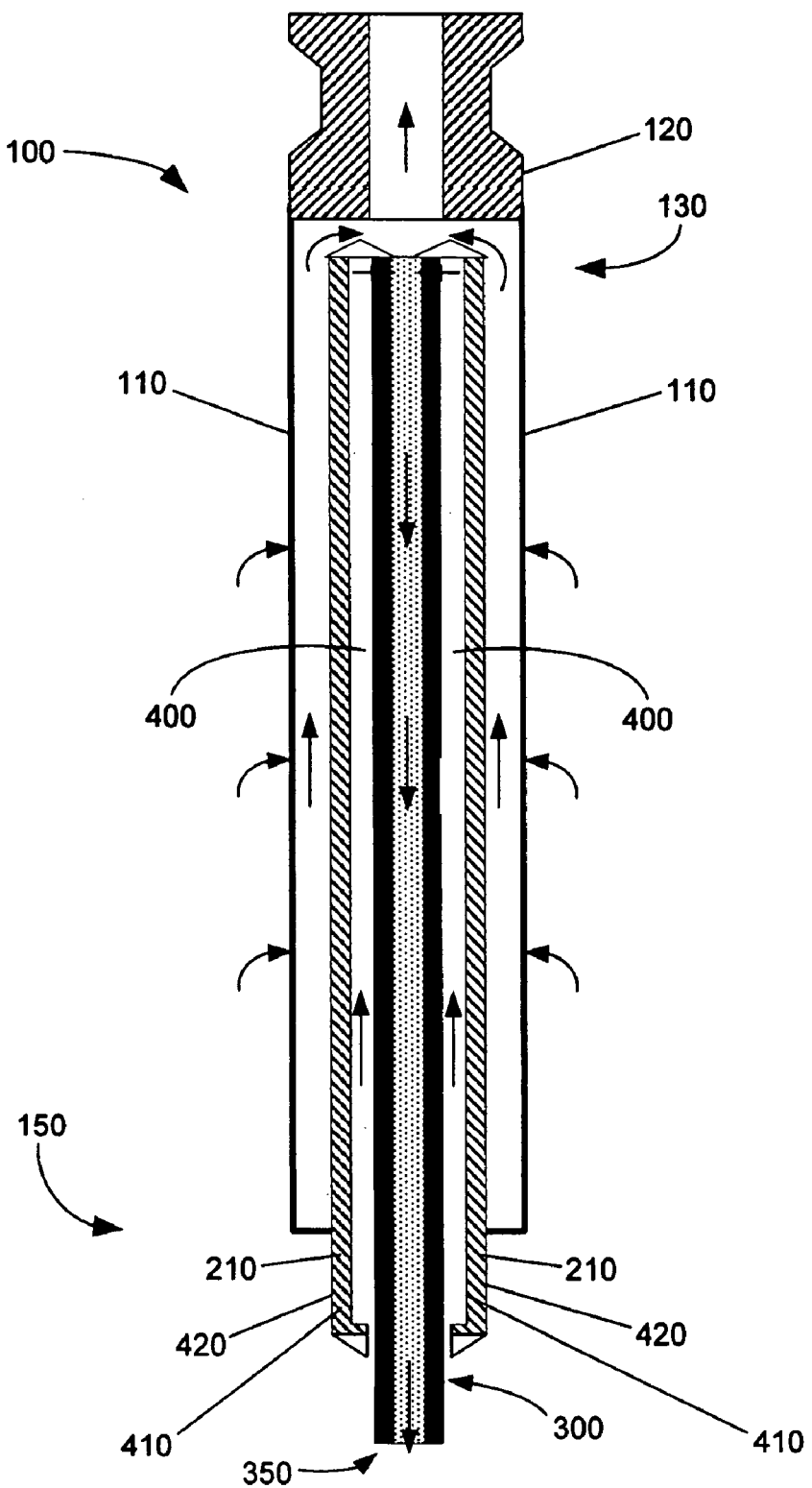
FIG. 4 illustrates a cross sectional view of an integrated fuel cell stack and catalytic combustor according to one exemplary embodiment.

As illustrated in FIG. 4, fuel and oxidant are introduced to the proximal end (150) of the integrated fuel cell stack and catalytic combustor (100). Fuel is conveyed through fuel channels (400) defined between the catalytic combustor (300) and the fuel cell stacks (210) while the oxidant is conveyed to and profiled by the cathode air profiling skin (110). The fuel and oxidant undergo an electrochemical reaction across the fuel cell stacks (210). Excess cathode air, fuel, and reaction byproducts are conveyed to the distal end (130) of the integrated fuel cell stack and catalytic combustor (100). Some excess cathode air is routed from the integrated fuel cell stack and catalytic combustors (100) by way of the excess cathode air router (120). Excess fuel and byproducts of the electrochemical reaction are conveyed from the fuel channels (400), by way of pass-throughs (320, FIG. 3A) and the flame arrestor (325, FIG. 3B) located inside the combustor shell (310, FIG. 3A) to the catalytic combustor (300). In addition to preventing a flame front from entering the fuel cell stack assembly (200), the flame arrestor also acts as an anode exhaust routing seal. Further, the flame arrestor picks up the negative connection via a brazed bond from the fuel cells (220) located on the fuel cell stacks (210) and electrically connects the fuel cell stack assembly (200) to the catalytic combustor (300). This connection connects both power producing flat sides of the fuel cell stack assembly (200, FIG. 2) in parallel.

Additionally, while the fuel cells (220) are deposited on the outer portion of the fuel cell stacks (210), the electrochemical materials are layered so as to have anodes (410) on the inside of the individual fuel cells (220) and cathodes (420) on the outer most surface. This architecture results in a fuel cell assembly (200) that produces power based on a fuel stream on the interior and an air stream on the exterior of the fuel cell stack assembly (200). Accordingly, the space between the catalytic combustor (300) and the fuel cell stack assembly (200) acts as the fuel flow channel (400).

As discussed, the remaining cathode air, the reaction byproducts, and excess fuel are conveyed to the catalytic combustor (300), which is disposed within the cavity formed by the fuel cell stacks (210), where the excess fuel and the oxidant are combusted. The exhaust is then removed from the catalytic exhaust (350) in the proximal end (150) of the integrated fuel cell stack and catalytic combustor assembly (100). Each of these processes will be discussed in more detail below.

Figure 5:
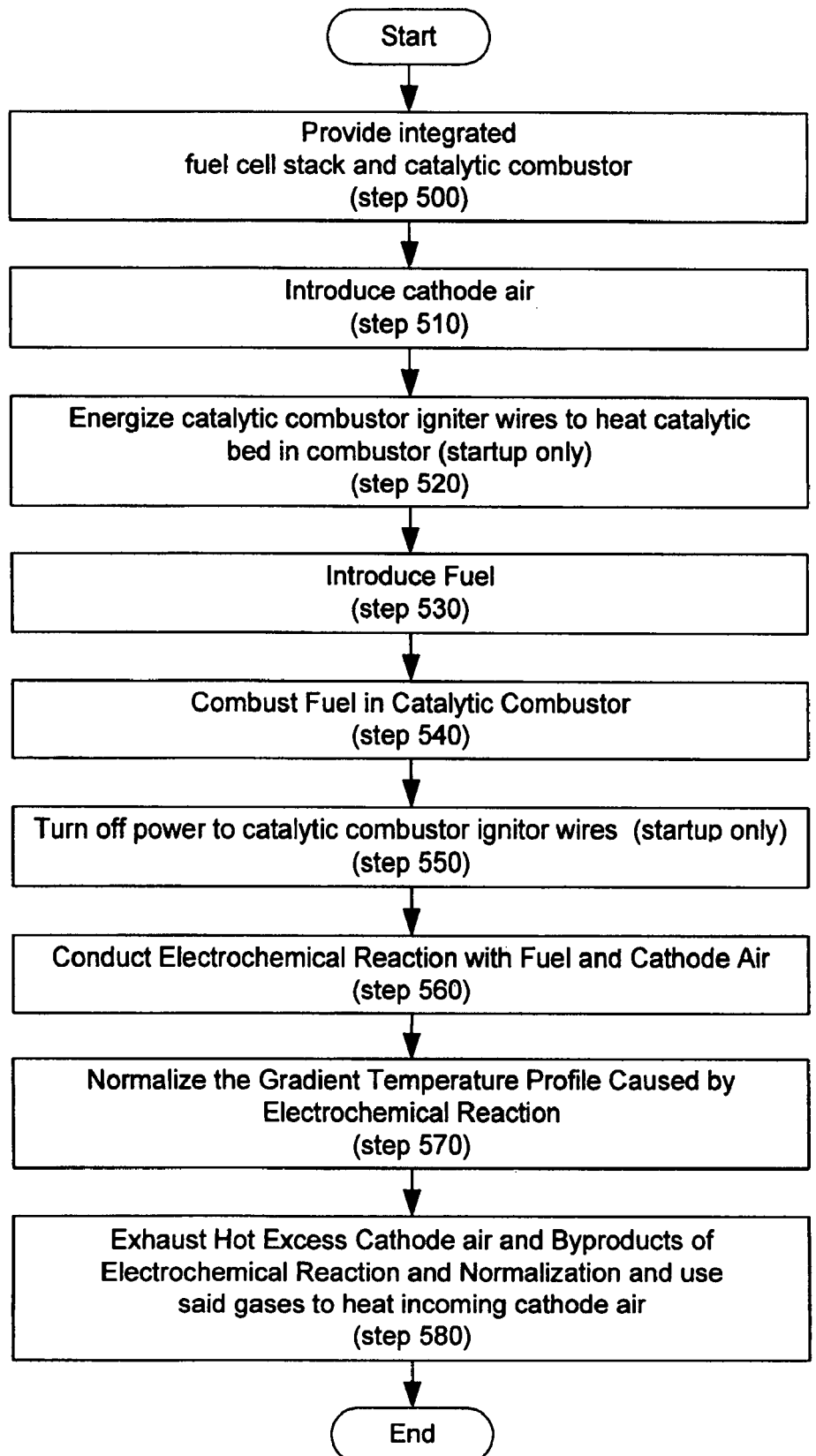
FIG. 5 is a flowchart of a method of producing electricity according to one exemplary embodiment.

FIG. 5 is a flowchart illustrating a method of using an integrated fuel cell stack and catalytic combustor. The process begins by providing an integrated fuel cell stack and catalytic combustor (step 500). In the illustrated embodiment, each integrated fuel cell stack and catalytic combustor includes a catalytic combustor disposed within a flat stack solid oxide fuel cell assembly. The fuel cell stack assembly includes opposing flat fuel cell stacks each having a plurality of individual fuel cells.

Each fuel cell includes an anode, an electrolyte, and a cathode disposed on a porous ceramic substrate. The individual fuel cells are located in such a fashion so as to have a positive connection near an incoming fuel end of the flat stack and a negative connection on the opposite end. Further, the individual fuel cells on the fuel cell stacks are connected in series and the number of fuel cells is determined by the desired voltage of the apparatus as well as the nominal operating voltage of each cell. As discussed, the electrochemical materials are layered so as to have anodic materials adjacent to the porous ceramic substrate on the inside of the fuel cell stacks and cathodic materials on the outermost surface of the fuel cell stacks. This architecture results in a fuel cell assembly that produces power based on a fuel stream on the interior and an air stream on the exterior. Accordingly, the space between the catalytic combustor and the flat stack acts as a fuel flow channel. A cathode air profiling skin surrounds the flat stack and defines a cathode air flow channel.

With the integrated fuel cell stack and catalytic combustor assembly provided, air is introduced via the cathode air profiling skin (step 510). The cathode air profiling skin may be configured to facilitate optimization of a flow profile over the fuel cell stack assembly by designing the location and the size of cathode air entrance points in the cathode air profiling skin. This allows a designer to optimize flow to reduce thermal gradients induced by more typical plug flow designs.

During startup and while the cathode air is flowing, a combustor igniter wire of the catalytic combustor is energized (step 520). The energizing of the combustor igniter wire begins the process of heating the catalytic core to the ignition temperature of the incoming fuel. While the combustor igniter wire is energized (step 520), fuel is introduced (step 530). The fuel is combusted in the catalytic combustor (step 540). This combustion further radiantly heats the assembly to its operating temperature. Once the catalytic core has reached its catalytic operating temperature, the igniter wires are de-energized or turned off (step 550), and the burning of fuel in the catalytic core begins heating the fuel cells to facilitate an electrochemical reaction (step 560).

The cathode produces oxygen ions from the air flowing over the cathode. The electrolyte conducts those oxygen ions formed at the cathode to the anode side where those ions react with the fuel at the anode. The reaction on the anode side produces electricity and water. During normal operation of the integrated fuel cell stack and catalytic combustor, not all of the fuel will be utilized in the fuel cell stack assembly due to depletion effects. This depletion is one factor that produces a temperature gradient in the fuel cell stacks assembly. The temperature gradient is typically characterized by a hottest end at the fuel entrance with temperature decreased away from the fuel entrance to the lowest temperature in the gradient at the exit end. A heat generation profile is created by the gradient combustion. This heat generation profile establishes a gradient temperature profile in the fuel cell stacks. If allowed to persist, this temperature gradient may contribute to a decreasing power production profile of the individual fuel cells along the length of the fuel cell stack assembly in the flow direction. In the present process, the temperature gradient of each of the fuel cell stacks is normalized (step 570). By "normalized," it is meant that the temperature or temperature profile is made more uniform along the length of the fuel cell stack assembly. This normalization may be accomplished by combusting the unutilized fuel and remaining excess cathode air in the catalytic combustor. This combustion is done in a counter-flow arrangement thereby creating a heat generation profile in the catalytic core opposite to that established by the electrochemical reaction (step 560).

The hot excess cathode air and byproducts of the electrochemical reaction and normalization are then exhausted and used to heat incoming cathode air (step 580). The opposite heat generation profile generated by the catalytic combustion tends to normalize the temperature profile along the length of the fuel cell stacks. Fine-tuning of this effect may be accomplished by graduated packing of the catalytic bed in the flow direction by varying catalytic bed particle size. In some embodiments, the catalytic bed is composed of catalytic beads. The bed of catalytic beads has a catalytic profile varying between a higher catalytic coefficient at a distal end of the catalytic combustor and a lower catalytic coefficient at a proximal end.

Due to the heat transfer of burning fuel in the catalytic combustor residing inside the fuel cell stack assembly, startup time may be reduced as compared to systems that use only convective heat transfer from heated incoming cathode air. In such systems, the incoming cathode air gives up heat to all the mass the cathode air encounters in route to the actual fuel cell electrochemical surface. This includes the overall stack mass as well as any heat exchangers that may be used to heat the cathode air. The integrated fuel cell stack and catalytic combustor has a near unity shape factor to facilitate radiant heat transfer to the fuel cell stack assembly. This heat transfer will facilitate the reduction of the startup time required for the fuel cell system to reach operating temperature and begin producing power. An analogy to this is the operation of a light bulb in which the interior is hot and producing light long before the exterior reaches an elevated temperature. Additionally, since radiative heat transfer is a fourth power function of temperature and the catalytic core temperature may approach 900 C and beyond, heat flux from the catalytic combustor shell to the fuel cell stack may be large and improve as the catalytic combustor shell, which may be of stainless steel, oxidizes and thereby increases its emmisivity. Further, the exhaust passes heats to the incoming cathode air manifolds, thereby preheating the cathode air which further leads to higher efficiency.

Figure 6:
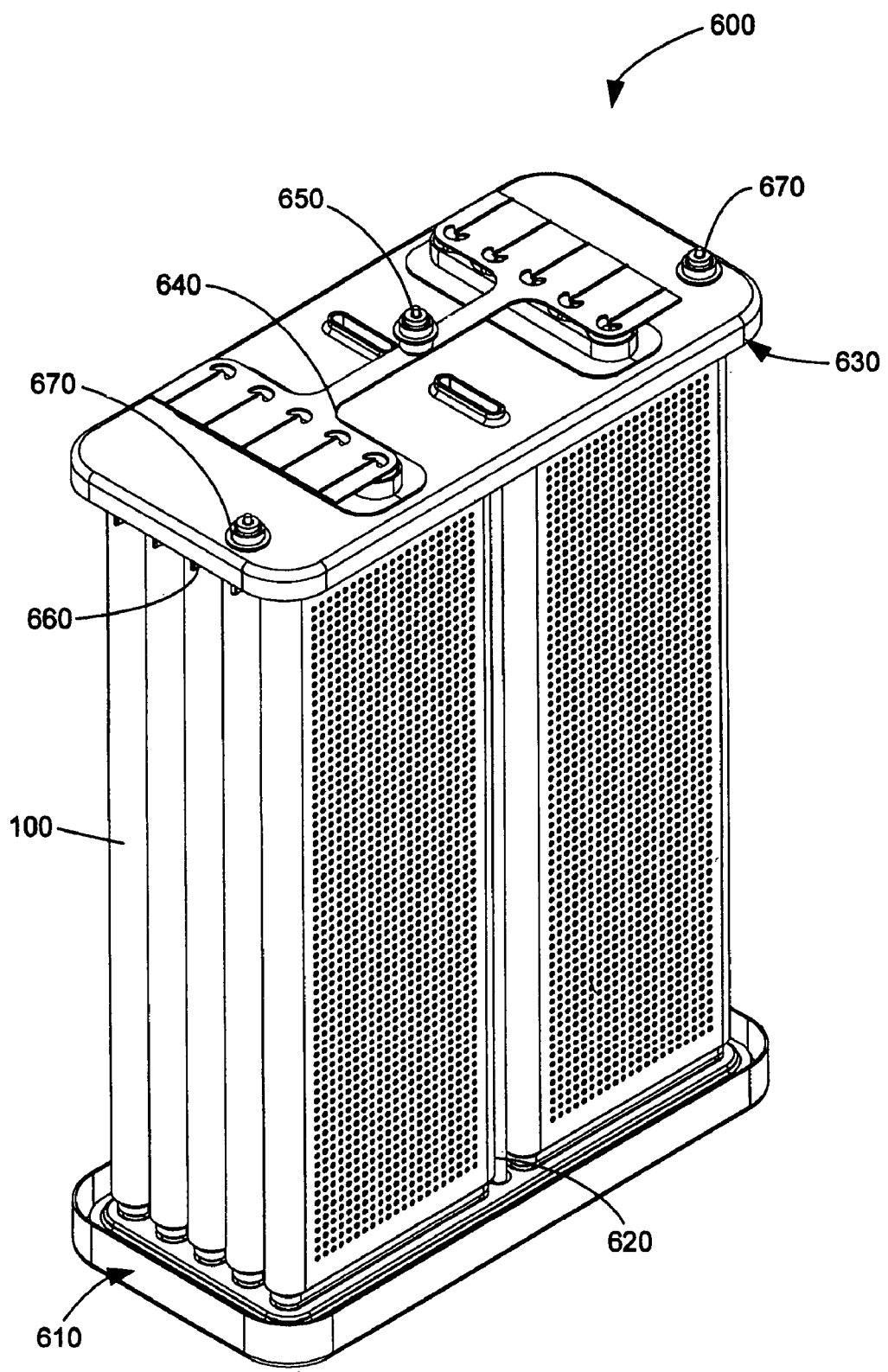
FIG. 6 illustrates a perspective view of an integrated fuel cell stack with integral catalytic combustor assemblies according to one exemplary embodiment.

FIG. 6 illustrates a plurality of integrated fuel cell stack and catalytic combustor apparatuses (100) grouped together to form integrated fuel cell stack and catalytic combustor assembly (600). The assembly (600) includes a lower manifold assembly (610), excess return air cathode towers (620) and an upper manifold assembly (630). A catalytic igniter assembly (640) is coupled to the upper manifold assembly (630). The catalyst igniter assembly (640) couples a catalyst igniter post (650) and the individual igniter wires (320, FIG. 3A) to the upper manifold assembly (630). In addition, an electrical interconnect (660) couples each of the integrated fuel cell stack and catalytic combustor apparatuses (100) to positive stack connection posts (670). The catalytic combustor (300, FIG. 4) inside of the fuel cell assembly (200, FIG. 2) reduces the overall volume that would be filled with fuel and potentially explosive in the event of a catastrophic failure of the ceramic fuel cell stack assembly.

The design shown in FIG. 6 uses a frame (700, FIG. 7) for the negative electrical connection to reduce the number of electrical pass throughs required and reduce ohmic losses. Electrical connections for the integrated fuel cell stack and catalytic combustor assembly (600) are accomplished by virtue of stack connection posts (670) utilizing a thermally stress-free connection design. Positive power of the integrated fuel cell stack and catalytic combustors (100) is accomplished by resistively bonding conductors to the cathode air profiling skins (110, FIG. 1) and to the positive stack connection posts (670). Negative connection is accomplished by bonding the catalytic igniter wires (330, FIG. 3A) to the lower manifold assembly (610). This wire (330, FIG. 3A) is also bonded to an exhaust screen (350, 351 FIG. 3A) for the catalytic bed (not shown) disposed within the catalytic core shell (310) of the catalytic combustor (300). This catalytic core shell (310) is at negative potential. The net result is that the overall assembly (600) is at ground potential. All integrated fuel cell stack and catalytic combustors (100) are in parallel as are the fuel cell stacks (210) of each fuel cell assembly (200). This means that voltage output of the assembly (600) is established by the series connection of individual cells (220, FIG. 2) on each side of the fuel cell stack assemblies (200, FIG. 2). The number of fuel cell stack assemblies (200, FIG. 2) used and their size dictates the power output of the stack. The illustrated implementation is arranged with the number of cells per tube side and number of tubular cell assemblies to deliver approximately 1 KW at 140 Volts.

The excess cathode air router (120, FIG. 1) not only routes excess cathode air, but also acts as an insulator. Accordingly, the excess cathode air router (120) insulates the positive potential of the cathode air profiling skin (110) from, the ground potential of the catalytic core and the rest of the overall stack frame. Further, the excess cathode air router (120) provides lateral support for the fuel cell stack assembly (200) by virtue of a slip fit with the cathode air profiling skin (110) and the anode exhaust routing seal and flame arrestor. In addition, by virtue of its geometry, which is dictated by the pressure drop, the excess cathode air router (120) partitions out cathode air to ensure complete catalytic combustion in the catalytic combustor (300) while allowing excess air to leave as discussed below. This arrangement acts to reduce the pressure drop that would be experienced if all excess air was forced to travel through the catalytic combustor bed. Furthermore, the excess cathode air router (120) acts to insulate the catalytic core igniter wire from shorting to the frame (700, FIG. 7).

Figure 7:
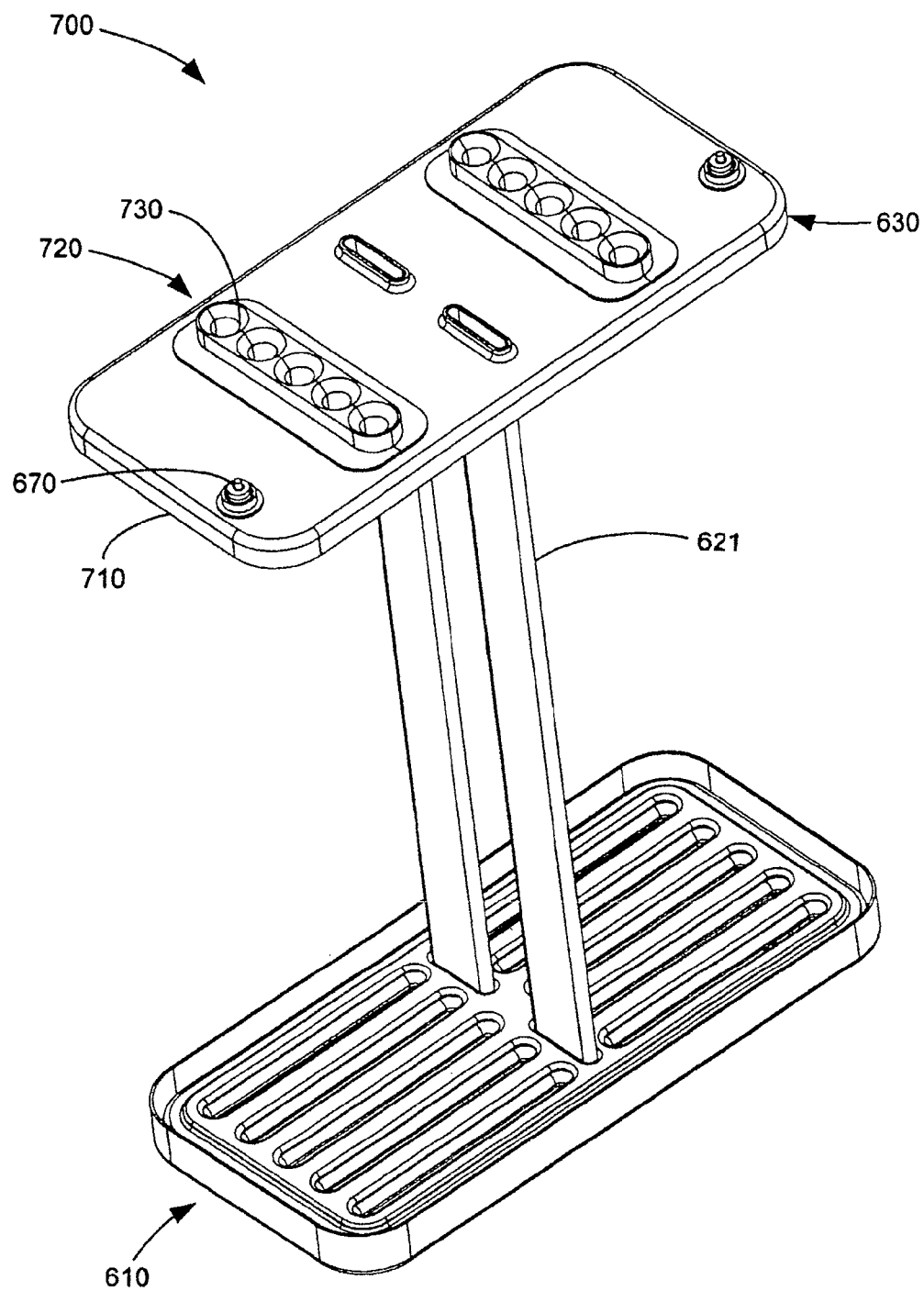
FIG. 7 illustrates a frame with cathode air routing features and stack mounting features implemented in one exemplary embodiment.

FIG. 7 illustrates a frame (700) in which the excess cathode air return towers (620) are coupled to the lower manifold assembly (610) and the upper manifold assembly (630). Thus, the frame (700) generally comprises an upper member (630), a lower member (610) and a transverse member (621) coupling said upper and lower members. The upper fuel manifold assembly (630) includes an upper support plate (710). A locator assembly (720) is coupled to the upper support plate (710). Further, the locator assembly (720) includes individual locators (730) for the excess cathode air routers (120). The locator assembly (720) conveys excess cathode air to the excess return air cathode towers (620). The excess cathode air is contained by a cap (910, FIG. 9) as it flows from the integrated fuel cell stack and catalytic combustors through the excess cathode air routers (120) and the locator assembly (720) to the excess return air cathode towers (620), thereby allowing for removal of a portion of the excess cathode air.

Figure 8A:
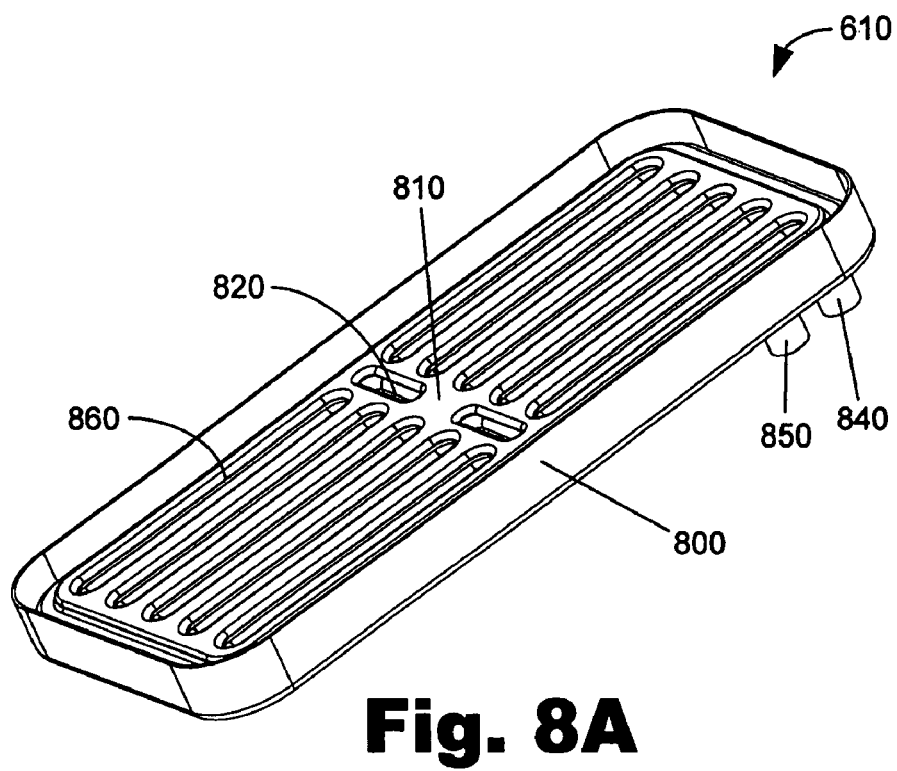
FIG. 8A illustrates a perspective view of a flow structure and support implemented in one exemplary embodiment.
Figure 8B:
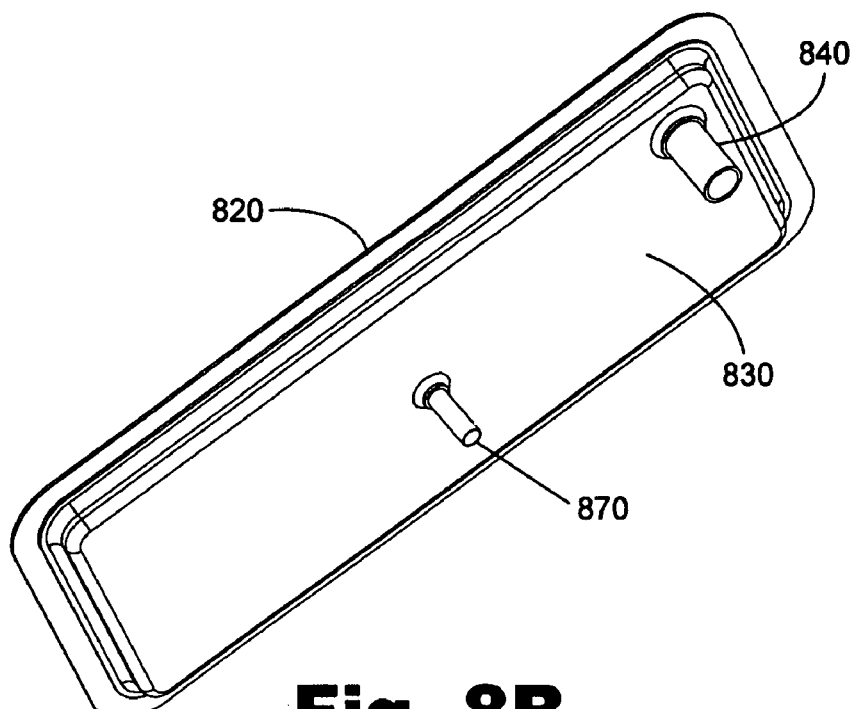
FIG. 8B illustrates a perspective view of a flow structure and support implemented in one exemplary embodiment.

FIGS. 8A-B illustrate the lower manifold assembly (610). The lower manifold assembly (610) includes a base (800), a fuel plenum plate (810), an interface plate (820) below the fuel plenum plate (810), an exhaust plenum plate (830) below the interface plate (820), an exhaust connection (840) from the exhaust plenum plate (830), and a cathode air inlet (850) through the bottom of the base (800). Oxidant is separated from fuel by the fuel plenum plate (810). Further, fuel is separated from exhaust by the interface plate (820). Accordingly, fuel is contained between the fuel plenum plate (810) and the interface plate (820) as the fuel is routed to each of the integrated fuel cell stack and catalytic combustors (100, FIG. 6). Further, exhaust is contained by the exhaust plenum plate (830) and the interface plate (820) as the exhaust is routed to the exhaust connection (840).

As illustrated, cathode air profiling occurs above the fuel plenum plate (810). Cathode air is introduced by the cathode air inlet (850) and is contained separate from incoming fuel by the fuel plenum plate (810) and the interface plate (820). Accordingly, cathode air is distributed around each of the integrated fuel cell stack and catalytic combustors (100, FIG. 6) in the assembly (600, FIG. 6) where the cathode air is in turn conveyed to each of the cathodes by the cathode air profiling skins (110, FIG. 1).

Incoming fuel is contained below the fuel plenum plate (810). Each fuel cell stack assembly (200, FIG. 2) extends through fuel inlet connection holes (860) defined in the fuel plenum plate (810) and is coupled thereto by the seal assembly (140, FIG. 1). The seal assemblies (140) are welded or otherwise coupled to the fuel plenum plate (810) and to the fuel cell stack assembly (200). In addition, the seal assembly (140) is insulated from the positive potential of the tubular assembly by virtue of its bonding to an electrochemically/electrically inactive portion of the flat ceramic tube. This allows for sealing between the fuel plenum plate (810) and the seal assembly (140, FIG. 1). The assembly can be laser or e-beam welded for robustness without shorting out the stack.

Exhaust plenum plate (830) is shown in FIG. 8B. In the view of FIG. 8B, the exhaust plenum plate (830) has been removed from the assembly shown in FIG. 8A and is illustrated with only the interface plate (820). The exhaust plenum plate (830) is coupled to and disposed below the interface plate (820) in the lower manifold assembly (610, FIG. 8A). The exhaust plenum plate (830) prevents incoming fuel from mixing with outgoing exhaust.

A fuel inlet (870) extends through exhaust plenum plate (830) and the interface plate (820) and is sealed to both. Accordingly, the shell (310, FIG. 3A) of the catalytic combustor (300, FIG. 3A) may extend through the fuel plenum plate (810) and may be slip fit into the interface plate (820). This slip fit, along with the slip fit of the cathode air profiling skin and the anode exhaust routing seal/flame arrestor on the excess cathode air router (120, FIG. 1) allows the integrated fuel cell stack and catalytic combustor (100) to expand and contract thermally without creating stress in the assemblies. Minor leakage of exhaust between the shell (310) and the interface plate (820) would result in exhaust gas recirculation which may potentially be beneficial to the performance of the integrated fuel cell stack and catalytic combustor assembly (600, FIG. 6) due at least in part to the promotion of internal reforming on and the suppression of undesirable deposition of carbon on the surface of the anode (410, FIG. 4). Minor leakage at the distal end (130, FIG. 1) between the cathode air profiling skin (110, FIG. 1) and the excess cathode air router and insulator (120, FIG. 1) would result in insignificant cathode air loss since percent excess air is dictated to be high due to thermal load issues.

The exhaust connection (840) is in fluid communication with the exhaust plenum plate (830). Accordingly, exhaust is contained between the interface plate (820) and the exhaust plenum plate (830) as it is directed to an external exhaust (not shown).

Figure 9:
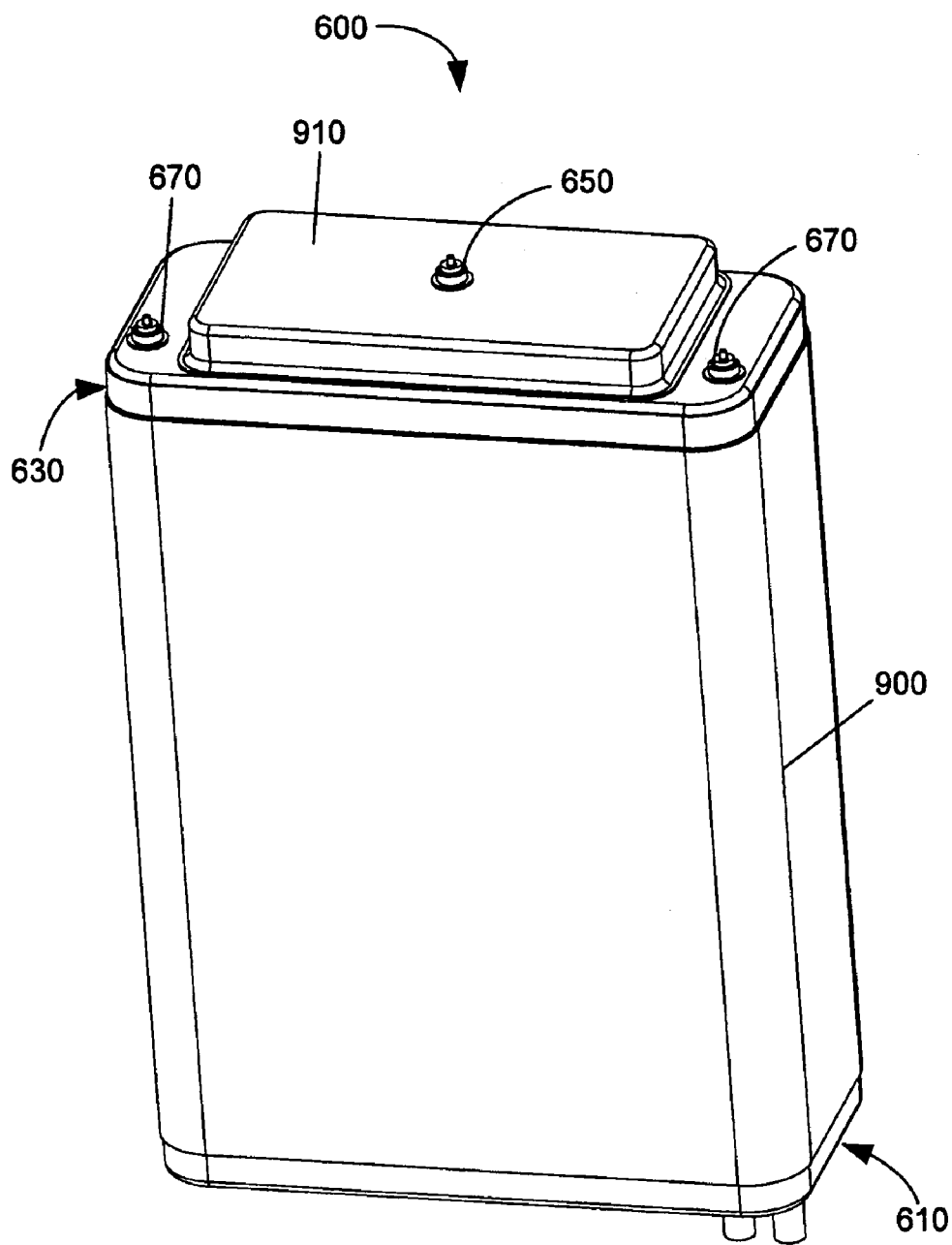
FIG. 9 illustrates an integrated fuel cell stack and catalytic combustor assembly according to one exemplary embodiment.

FIG. 9 illustrates the integrated fuel cell stack and catalytic combustor assembly (600) surrounded by a housing (900). The housing (900) prevents the release of potentially explosive fuel and/or fuel and air mixtures into the air while facilitating profiling of cathode air by the cathode air profiling skin (110, FIG. 1). As described above, the cap (910) contains excess cathode air as it flows from the integrated fuel cell stack and catalytic combustors (100, FIG. 6) through the excess cathode air routers (120), the locator assembly (720) to excess return air cathode towers (620), thereby allowing for removal of a portion of the excess cathode air.

Fabrication

The components of the integrated fuel cell stack and catalytic combustor assembly (600, FIG. 6) may be constructed using well known processes such as stamping, rolling, punching and other conventional machining operations. Further, the components may be made of ferritic stainless steel, ceramics, and/or powdered metal as appropriate.

The anode and cathode may be formed by any suitable process, including screen printing, spin-on deposition, colloidal spray deposition, doctor blade methods, or any other method known to those in the art. The electrolyte may be formed by any suitable process, such as sputter deposition.

The cathode may be any cathode capable of converting oxygen or air into oxygen ions, and may include, but is in no way limited to, a mixed conducting perovskite such as lanthanum manganite ($LaMnO_3$). The anode may be any anode capable of releasing electrons to an external circuit when a fuel such as hydrogen or methane is received and reacts with the oxygen ions. The materials used to form the anode may include, but are in no way limited to, a ceramic/metal composite such as an electronically conducting nickel/yttria-stabilized zirconia cermet. The electrolyte may be any oxygen ion conducting electrolyte including, but in no way limited to, zirconia-based electrolytes such as yttria-stabilized zirconia, gadolinium-doped ceria, $Ba_2In_2O_5$, or a (strontium, magnesium)-doped $LaGaO_3$ (LSGM).

ALTERNATIVE EMBODIMENTS

Figure 10:
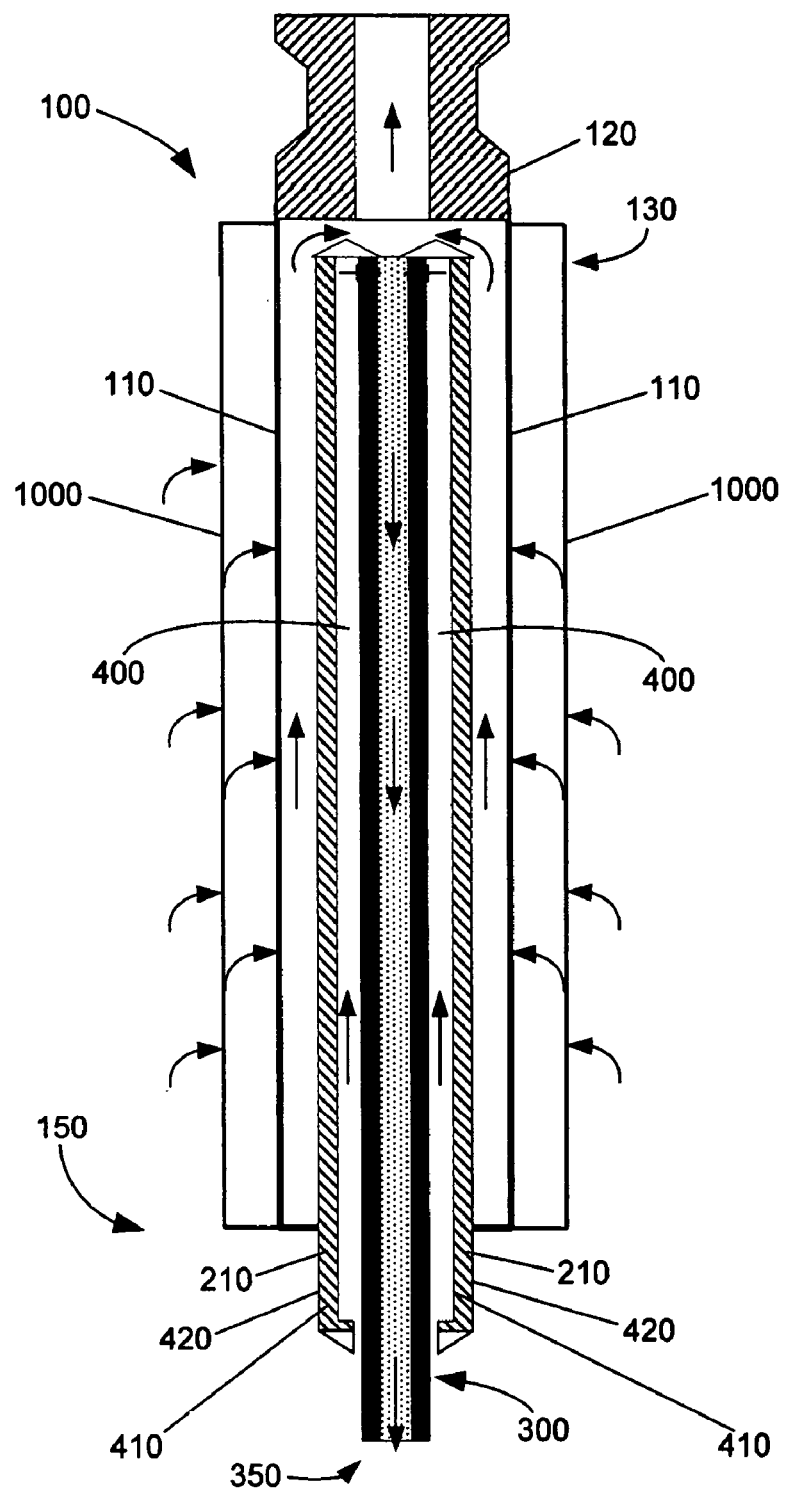
FIG. 10 illustrates a cross sectional view of an integrated fuel cell stack and catalytic combustor according to one exemplary embodiment.

As shown in FIG. 10, a second or intermediate profiling skin (1000) may be added over the cathode air profiling skin (110) to facilitate further pressure balancing for flow optimization. Use of a second skin may allow pressure balancing of cathode air entrance points to be accomplished by skin to skin spacing and flow length between entrance and exit holes in respective skins.

In addition, those of skill in the art will recognize that any number of individual fuel cells (220, FIG. 2) may be disposed on the fuel cell stacks (210, FIG. 2) and that any number of integrated fuel cell stack and catalytic combustors (100, FIG. 1) may be grouped together to form a integrated fuel cell stack and catalytic combustor assembly (600, FIG. 6).

The preceding description has been presented only to illustrate and describe the present method and apparatus. It is not intended to be exhaustive or to limit the disclosure to any precise form disclosed. Many modifications and variations are possible in light of the above teaching. It is intended that the scope of the invention be defined by the following claims.

What is claimed is:

1. A method of producing electricity, comprising:
   electrochemically reacting an oxidant and a fuel across fuel cell stacks, thereby establishing a temperature profile along said fuel cell stacks, the temperature profile comprising a decreasing temperature gradient from a stack fuel entrance to a stack fuel exit; and
   catalytically combusting surplus reactants of said reaction to create a heat generation profile with a temperature gradient that is opposite the temperature gradient of the temperature profile along the stacks to normalize said temperature profile; wherein
   the catalytic combusting is within a catalytic combustor disposed between the fuel cell stacks, and the heat generation profile within the catalytic combustor comprises an increasing temperature gradient from an area in the catalytic combustor adjacent to the stack fuel entrance to an area in the catalytic combustor adjacent to the stack fuel exit.

2. The method of claim 1, further comprising performing said catalytic combusting with a catalytic combustor disposed at least partially between said fuel cell stacks.

3. The method of claim 1, further comprising flowing an oxidant over cathodes disposed on an exterior of said fuel cell stacks and flowing a fuel over anodes disposed on an interior of said fuel cell stacks.

4. The method of claim 3, wherein said flowing an oxidant and said flowing a fuel comprise flowing said oxidant and said fuel in substantially the same direction over said fuel cell stacks.

5. The method of claim 4, wherein said catalytic combusting comprises flowing the surplus reactants of said reaction in a direction counter to said direction of flow of said fuel and said oxidant.

6. The method of claim 4, further comprising withdrawing excess cathode air from said surplus reactants.

7. The method of claim 1, further comprising regulating air flow to cathodes along a length of said fuel cell stacks with a cathode air profiling manifold.

8. The method of claim 2, further comprising modulating the rate of said catalytic combustion along a length of said catalytic combustor.

9. The method of claim 8, wherein said modulating comprises providing a catalytic bed having a graduated packing bead profile.

10. The method of claim 1, further comprising delivering electricity from said fuel cell stacks.

* * * * *